Patented Nov. 28, 1950

2,531,801

UNITED STATES PATENT OFFICE 2,531,801

LUBRICATING OIL COMPOSITION

Edward S. Blake, Nitro, W. Va., assignor to Monsanto Chemical Company, St. Louis, Mo., a corporation of Delaware No Drawing. Application June 21, 1946,
Serial No. 678,374

11 Claims. (Cl. 252—56)

This invention relates to compounded lubricants and particularly to the method of making cutting oils and the compositions obtained thereby.

Mineral oil which serves as the base of most lubricants is commonly admixed with various agents to render it more acceptable for a particular type of lubrication. Thus, oils employed in grinding, polishing, and cutting metallic bodies of various kinds must be suitably compounded if they are to function efficiently. The oil serves the dual function of coolant and lubricant. Unless the oil has a high film strength and low wear characteristics frequent dressing of the abrasive grinding, cutting or polishing wheel is necessary which tends to make the operation time consuming.

While many addition agents have been proposed for improving the lubricating action of mineral oils to render them useful as cutting oils, it is becoming increasingly apparent that the problem is not a generic one susceptible to a generic or panacean solution since the action of these additives is in general highly specific and unpredictable. The activity of the adjuvants is surprisingly sensitive to small changes in structure.

In accordance with the present invention it has been discovered that the efficiency of mineral oil for use in cutting operations is enhanced by the addition of aliphatic hydroxy poly esters. More particularly, it has been found that products containing a free hydroxyl group separated from a long carbon chain by a plurality of ester groups are valuable mineral oil adjuvants. Essential characteristics of these products are that a free hydroxyl group is separated from the long carbon chain by at least two ester groups and by no more than two carbon atoms from either a free carboxyl group or the first of at least two additional ester groups also terminating in a long carbon chain. While the length of the hydrocarbon chain is subject to considerable variation, it must contain at least five carbon atoms but preferably at least ten carbon atoms. Thus, the derivatives of caproic acid are distinctly less satisfactory than esters derived from higher members of the series while derivatives below caproic acid are entirely unsuitable.

In general, the compounds or reaction products added to the oil in accordance with this invention are conveniently prepared by partially esterifying a polyhydric alcohol with a higher fatty acid and completing the esterification with an aliphatic hydroxy polycarboxylic acid having at least one hydroxyl group not more than two carbon atoms removed from a carboxyl group. Since the initial product of the reaction without further purification contains noticeable amounts of other constituents, the product may best be defined as reaction product but the main constituents may be assigned a structural formula of the type hereinafter set forth.

The hydroxy polycarboxylic acids which are esterified with the higher fatty acid ester alcohols may be selected from a large group, typical examples being citric acid, tartaric acid, malic acid, hydroxy methyl succinic acid, mucic acid, tartronic acid, methyl tartronic acid, alpha hydroxy glutaric acid, and beta hydroxy glutaric acid.

The long chain fatty acid ester alcohols with which hydroxy acids of the type exemplified above may be condensed are likewise subject to wide variation. Typical examples derived from monoethylene glycol comprise ethylene glycol monolaurate, ethylene glycol monopalmitate, ethylene glycol monomargarate, ethylene glycol monostearate, ethylene glycol monooleate, ethylene glycol mono ester of coconut oil fatty acid, ethylene glycol mono ester of rapeseed oil fatty acid, and the ethylene glycol mono ester of castor oil fatty acid.

Still other examples are 1,2 propylene glycol mono palmitate, 1,2 propylene glycol mono stearate, 1,2 propylene glycol mono oleate, 1,3 propylene glycol mono stearate, 1,3 propylene glycol mono palmitate, 1,3 propylene glycol mono oleate, diethylene glycol mono ester of myristic acid, diethylene glycol mono ester of stearic acid, diethylene glycol mono ester of oleic acid, glycerol dicaproate, the mono oleate of beta beta' dihydroxy diethyl sulfide, glycerol di caprylate, glycerol mono laurate, erythritol dipalmitate, erythritol distearate, penta erythritol mono oleate, glycerol dilaureate, glycerol monomyristate, glycerol dimyristate, penta erythritol dioleate, glycerol mono palmitate, glycerol dipalmitate, glycerol monostearate, glycerol distearate, glycerol mono oleate, glycerol dioleate, and penta erythritol dilaurate. All of the above alcohol esters contain at least one esterifiable hydroxy group. While the ratio of higher fatty acid, polyhydric alcohol and hydroxy polycarboxylic acid is subject to wide variation, the compositions principally contemplated by this invention are those prepared by esterifying at least half of the hydroxyl groups of a polyhydric alcohol with a higher fatty acid and then completely esterifying the partially esterified polyhydric alcohol with an hydroxy polycarboxylic acid.

Representative examples of the new products are those possessing the following structural formula:

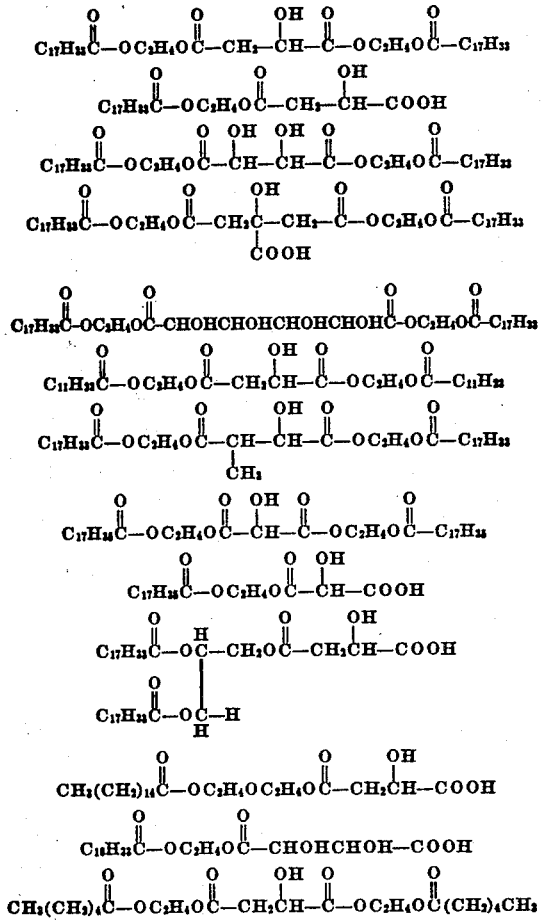

Methods for making the polyhydric alcohol esters of higher fatty acids are well known and any suitable method resulting in the formation of an alcohol ester may be used. The alcohol ester is then employed to esterify an hydroxy polycarboxylic acid which may be completely esterified or one or more of the carboxylic groups left unesterified. Similarly, mixtures of neutral and acid esters may be prepared and are within the scope of this invention.

The following examples illustrative in detail the preparation of the new oil adjuvants but are not to be taken as limitative for this invention relates to mineral oil compounded with products of the aforedefined class regardless of how they are prepared.

*Example I*

Substantially 111 parts by weight of the ethylene glycol mono ester of commercial oleic acid and substantially 22.3 parts by weight of malic acid were heated together for 12 hours under a reflux condenser with a water take-off at 110-130° C., the system being under reduced pressure. During this heating the pressure gradually dropped from 50 millimeters to 4 millimeters as the water evolved as a by-product of the reaction distilled out of the reaction mixture. The residue was a brown liquid comprising di(ethylene glycol mono oleate) malate and had a saponification number of 268 as compared to a calculated value of 299. The product without further purification had on the average a neutralization number of about 18.

Where necessary or desirable the product may be purified and the remaining acid constituents removed by washing, precipitation, or other suitable means. For example, 200 parts by weight of the crude product was taken up in approximately 475 parts by weight of alcohol containing 5 parts by weight of KOH. Approximately 264 parts by weight of benzene and 200 parts by weight of water were added and after mixing thoroughly, the bottom layer was drawn off and the benzene layer washed repeatedly with alcohol and water in the ratio by volume of 3.5 parts of alcohol for each part of water and then with water until neutral, ether being added to break up any emulsions which formed. The solvent layer was dried, filtered through Attapulgus clay, and the solvent removed by distillation under reduced pressure. The residue comprising the purified neutral ester had a neutralization number of only 0.59.

*Example II*

Substantially 180 parts by weight of the ethylene glycol mono ester of lauric acid and 44.6 parts by weight of malic acid were heated together for 12 hours under a reflux condenser with a water take-off at 125-132° C. under 5-10 mm. pressure. An additional 5 parts by weight of ester was then added and heating continued 11 hours at 124-131° C. under about 3 mm. pressure. The resulting product was treated with 10 parts of Attapulgus clay and filtered through a bed of diatomaceous silica. The resulting product comprising essentially di(ethylene glycol mono laurate) malate was a dark amber liquid. The product without further purification had a neutralization number of 14.8.

*Example III*

A reaction charge consisting of substantially 33.5 parts by weight of malic acid, 189.2 parts by weight of technical glycol mono stearate of a purity according to analysis of 88.5%, 1.0 part by weight of toluene sulfonic acid and substantially 450 parts by weight of diethyl carbitol was placed in a suitable reaction vessel fitted with a reflux condenser and water separator. A quantity of benzene was added sufficient to give the mixture a refluxing temperature of about 130° C. The mixture was then heated at refluxing temperature for 66 hours and the solvent stripped out by heating under reduced pressure at 155° C./4 mm. The residue was dissolved in a suitable water immiscible solvent as for example a mixture of benzene and ether and washed with water, then filtered through a bed of clay. The solvent was again removed by heating up to 155° C. under 4 mm. pressure, leaving a dark brown liquid of neutralization number 16.9 which solidified on cooling. The product was essentially di(ethylene glycol mono stearate) malate.

*Example IV*

Substantially 26.8 parts by weight of citric acid was dissolved in approximately 360 parts by weight of diethyl carbitol. Solution was effected by heating at about 80° C. Substantially 160 parts by weight of glycol mono oleate, purity 88.3%, and 1.0 part by weight of toluene sulfonic acid were added to the solution together with the quantity of benzene required to impart a refluxing temperature of about 150° C. The mixture was heated under reflux with a water take-off trap for 46 hours and the solvent stripped out by distilling up to 140° C. under 5 mm. pressure. The residue was dissolved in a mixture of benzene and ether, washed with water until neutral to litmus and filtered through a bed of clay. The solvent was again removed by distillation under reduced pressure, the temperature of the mass being raised to 146° C./4 mm. The residue comprising the desired tri(ethylene glycol mono oleate) citrate was a brown liquid product, neutralization number 14.9.

*Example V*

The mono caproate of ethylene glycol was prepared by heating caproic acid with an excess of ethylene glycol. The charge consisted of 290 parts by weight of caproic acid (substantially 2.5 molecular proportions), 620 parts by weight of mono ethylene glycol (substantially 10 molecular proportions), and 2.0 parts by weight of toluene sulfonic acid. The mass was heated under a reflux condenser with a water trap at 120–136° C. for 5½ hours under six inches of mercury pressure, then 30 parts by weight of calcium carbonate added to neutralize the acid catalyst, and the unreacted excess of glycol removed by distillation. 517 parts by weight was removed by heating at 115° C./3 mm. This distillate was diluted with water whereby 83 parts by weight of water insoluble product was obtained which was dried over anhydrous sodium sulfate and added to 270 parts by weight of distillate obtained by continuing the heating under reduced pressure. The combined material was washed with water and sodium bicarbonate solution, dried over anhydrous sodium sulfate, filtered, and purified by distillation. Approximately 160 parts by weight of glycol mono caproate was obtained. The product distilled at 106–110° C./1–2 mm. pressure, had a neutralization number of zero and evolved 27.3 cc. of methane by the Zerewitnoff method of hydroxyl determination as compared to a calculated value of 27.2 cc.

The neutral malate was prepared from this alcohol ester by heating 143 parts by weight of the glycol mono caproate so prepared with 58.6 parts by weight of malic acid. Sufficient benzene was added to impart a refluxing temperature of 115–132° C. and after 8¾ hours heating at this temperature under a reflux condenser with a water take-off, 8 parts by weight of glycol mono caproate was added and heating continued at 135–136° C. for 7 hours. Substantially the theoretical quantity of water was collected during the heating. The benzene was removed by distillation and the residue washed with water and dried over anhydrous sodium sulfate. Any volatile unreacted constituents still remaining were then removed by heating up to 130° C. under 3 mm. pressure. The residue comprising the desired di(ethylene glycol mono caproate) malate was a light amber liquid, neutralization number 14.2.

*Example VI*

Substantially 271.5 parts by weight of technical grade malic acid was stirred at about 100° C. with diethyl carbitol until solution was effected and decanted or filtered from a small amount of insoluble impurities. The solution of malic acid in approximately 1350 parts by weight of diethyl carbitol was charged into a reaction vessel of suitable capacity fitted with a reflux condenser, stirrer and water trap. Substantially 150 parts by weight of technical glycol mono oleate which analysis showed was about 88.3% pure was added together with benzene sufficient to impart a refluxing temperature of 127–130° C. The reaction mixture was heated at this temperature for approximately 17 hours under a reflux condenser with a water trap and then about one-third of the solvent distilled off under vacuum and the residue poured into water. The water solution was extracted with a suitable solvent, as for example ether, and the ether extracts washed with water. The solvent was removed by heating up to 130° C. under 2 mm. pressure, the residue redissolved in a petroleum ether solvent, filtered through a bed of clay, and the solvent again removed by stripping under a vacuum. The buff solid so obtained consisting of a mixture of the acid and neutral ester was then purified by suitable solvent extraction to isolate the acid ester.

Substantially 7.9 parts by weight of sodium hydroxide was dissolved in 473 parts by weight of alcohol and admixed with 537 parts by weight of benzene. The addition of 150 parts by weight of water resulted in the formation of two layers of which the alcohol-aqueous layer was drawn off and 133.8 parts by weight of the ester mixture dissolved in the benzene layer. The aqueous-alcohol was again added and thoroughly shaken with the benzene solution after which 50 parts of water were added and the mixture allowed to stand until two layers separated. The aqueous-alcohol layer was drawn off and extracted twice more with 440 parts by weight of benzene. The benzene washings were combined and extracted twice with 50 parts by weight of water, the water extracts being added to the main alcohol-water portion. The combined aqueous-alcohol portion was again extracted with benzene and then neutralized with hydrochloric acid until just acid to Congo red. The acid solution was extracted with 220 parts by weight of benzene and the benzene extract washed with water. Since at this point there was a tendency of the mixture to emulsify, ether was added to break up the emulsion. The wash water was now acid to litmus but not to Congo red. The ether-benzene layer was dried over anhydrous sodium sulfate and vacuum treated up to 90° C. under 6 mm. pressure. The product was a thick brown liquid, neutralization number 140 as compared to the calculated value of 127 for mono(glycol mono oleate) malate.

*Example VII*

Glycerol dioleate was prepared by heating 561 parts by weight of oleic acid, 92 parts by weight of glycerol, and 4 parts by weight of phosphoric acid for 16½ hours at 169–180° C. at reduced pressure under a reflux condenser with a water take-off. The pressure gradually was reduced from 75 to 1 millimeter of mercury during the heating and the theoretical amount of water collected. The neutralization number was 0.23 after the heating period and the saponification number 190 as compared to a calculated value of 181.

Substantially 225 parts by weight of the above glycerol dioleate was heated with 17.9 parts by weight of malic acid at 5 mm. pressure under a reflux condenser with a water trap. After heating 7½ hours at 122–131° C., the reaction mixture had a neutralization number of 8.5. This product consisting essentially of di(glyceryl dioleate) malate was a clear dark amber syrupy liquid.

As specific embodiments of the invention mineral lubricating oil compositions were compounded containing 1.0% based on the oil of various hydroxy poly esters of this invention and the oil compositions so compounded employed as lubricants in conventional tapping operations. The oil compositions employed contained as the additive the following poly esters: di(glycerol dioleate) malate; mono(glycol mono oleate) malate; tri(glycol mono oleate) citrate; di(glycol mono oleate) tartrate and di(glycol mono laurate) malate. In each case the tapping efficiency was very high and showed that each of the additives imparted to mineral oil properties suitable for use in tapping and threading operations.

A modification of the Falex wear test is also useful for illustrating the desirable lubricating characteristics of the cutting oils of this invention. For this purpose a Falex lubricant testing machine is employed and the weight lost by the pin and bushings is determined. If the loss is no more that 4 milligrams, the oil may be regarded as satisfactory.

To carry out the determination, the oil sample is filled to the mark, the bushings are inserted in the recesses with the V grooves vertical and the brass shear pin is inserted through the test pin. The pin and bushings are then immersed in the filled oil cup and the load gauge assembly slipped on the load arms. The machine is run at a constant load of 50 lbs. for 15 minutes and the load is then increased to 150 lbs. After running 3 hours at 150 lbs. jaw load, the pin and bushings are examined for any oil instability and the pin and bushings, after washing thoroughly in gasoline, and drying, are weighed to determine the number of milligrams loss in weight. Compositions were made up according to the present invention consisting of a mineral oil of viscosity range suitable for lubrication and 1.0% based on the oil of the additive and the compounded oils evaluated in the manner just described. The long chain fatty acid mono esters of mono ethylene glycol further esterified with an hydroxy polycarboxylic acid are especially effective for reducing wear and in this respect are superior to the glycerol esters.

| Additive | Falex Wear Test Mgs. Loss |
| --- | --- |
| Di(glycol mono laurate) malate | 4.0 |
| Di(glycol mono stearate) malate | 3.1 |
| Di(glycol mono oleate) tartrate | 3.7 |
| Tri(glycol mono oleate) citrate | 2.4 |
| Di(glycol mono oleate) malate | 1.9 |
| Mono(glycol mono oleate) malate | 0.7 |

In every case the stability of the oil at room temperature was satisfactory. There was no evidence of flocculent material nor sludge of any kind. In addition the tapping efficiency and the Oster threading efficiency of the oils was very high.

Many variations in the specific compositions described may be made as will be apparent to those skilled in the art to which this invention applies. Other ingredients may be added to the oil. For example, the new poly esters may be employed in conjunction with chlor alkyl esters of alkyl xanthates, sulfurized sperm oil, sulfurized lard oil, tri cresyl phosphate, and the like.

The amounts of polyester required to be added to hydrocarbon or fatty lubricating oils vary somewhat, depending upon the character of the lubricating stock used as a base, and the severity of the service for which they are designed; however, the polyester is always present in minor amount with respect to the oil base and in general varies between about 1% and about 10% of the oil base by weight although amounts outside of this range can be used where convenient or desirable. Appreciable benefit is conferred by amounts below 1% as for example 0.1%. Since the polyesters are fully soluble in lubricating oils, a wide range of homogeneous compositions can be prepared. Where desired concentrates can be prepared containing relatively large amounts, as for example 50%, of the polyester and stored or transported in this form.

The present invention is limited solely by the claims attached hereto as part of the present specification.

What is claimed is:

1. A compounded lubricating oil comprising predominately a mineral lubricating oil said oil having incorporated therein 0.1% to 10% with respect to the oil base of an oil soluble partial ester of a higher fatty acid containing at least 6 but not more than 22 carbon atoms and a polyhydric alcohol further esterified with a saturated aliphatic hydroxy polycarboxylic acid having not more than three carboxyl groups and at least one hydroxyl group not more than two carbon atoms removed from a carboxyl group of said acid.

2. A compounded lubricating oil comprising predominately a mineral lubricating oil said oil having incorporated therein 0.1% to 10% with respect to the oil base of an oil soluble mono ester of a higher fatty acid containing at least 6 but not more than 22 carbon atoms and a dihydric alcohol further esterified with a saturated aliphatic hydroxy polycarboxylic acid having not more than three carboxyl groups and at least one hydroxyl group not more than two carbon atoms removed from a carboxyl group of said acid.

3. A compounded lubricating oil comprising predominately a mineral lubricating oil said oil having incorporated therein 0.1% to 10% with respect to the oil base of an oil soluble mono ester of a glycol and a fatty acid containing at least ten but not more than eighteen carbon atoms further esterified with a saturated aliphatic hydroxy polycarboxylic acid having not more than three carboxyl groups and at least one hydroxyl group not more than two carbon atoms removed from a carboxyl group of said acid, the number of mols of said mono ester employed for esterification being equal to the number of carboxyl groups of the hydroxy polycarboxylic acid.

4. A compounded lubricating oil comprising predominately a mineral lubricating oil said oil having incorporated therein 0.1% to 10% with respect to the oil base of an oil soluble mono ester of a glycol and a fatty acid containing at least ten but not more than eighteen carbon atoms further esterified with a saturated aliphatic hydroxy polycarboxylic acid having not more than three carboxyl groups and an hydroxyl group in an alpha position with respect to a carboxyl group thereof.

5. A compounded lubricating oil comprising predominately a mineral lubricating oil said oil having incorporated therein 0.1% to 10% with respect to the oil base of an oil soluble mono ester of a glycol and a fatty acid containing at least ten but not more than eighteen carbon atoms further esterified with a saturated aliphatic hydroxy polycarboxylic acid having not more than three carboxyl groups and an hydroxyl group in a beta position with respect to a carboxyl group thereof.

6. A compounded lubricating oil comprising predominately a mineral lubricating oil said oil having incorporated therein 0.1% to 10% with respect to the oil base of an oil soluble mono ester of a fatty acid containing at least ten but not more than eighteen carbon atoms and an ethylene glycol further esterified with a saturated aliphatic hydroxy polycarboxylic acid containing not more than three carboxyl groups and containing an hydroxyl substituent not more than two carbon atoms removed from a carboxyl group of the acid.

7. A compounded lubricating oil comprising predominately a mineral lubricating oil said oil having incorporated therein 0.1% to 10% with respect to the oil base of an oil soluble mono ester of a fatty acid containing at least ten but not more than eighteen carbon atoms and mono ethylene glycol further esterified with a saturated aliphatic hydroxy polycarboxylic acid containing not more than three carboxyl groups and containing an hydroxyl substituent not more than two carbon atoms removed from a carboxyl group of the acid.

8. A compounded lubricating oil comprising predominately a mineral lubricating oil said oil having incorporated therein 0.1% to 10% with respect to the oil base of an oil soluble organic hydroxy neutral ester derived from a fatty acid containing at least ten but not more than eighteen carbon atoms and mono ethylene glycol further esterified with a saturated aliphatic dicarboxylic hydroxy acid containing four carbon atoms.

9. A compounded lubricating oil comprising predominately a mineral lubricating oil said oil having incorporated therein 1.0% to 10% with respect to the oil base of di(glycol mono oleate) malate.

10. A compounded lubricating oil comprising predominately a mineral lubricating oil said oil having incorporated therein 1.0% to 10% with respect to the oil base of mono(glycol mono oleate) malate.

11. A compounded lubricating oil comprising predominately a mineral lubricating oil said oil having incorporated therein 1.0% to 10% with respect to the oil base of di(glycol mono oleate) tartrate.

EDWARD S. BLAKE.

REFERENCES CITED

The following references are of record in the file of this patent:

UNITED STATES PATENTS

| Number | Name | Date |
|---|---|---|
| 2,023,976 | Roberts | Dec. 10, 1935 |
| 2,234,722 | Dickey | Mar. 11, 1941 |
| 2,343,434 | Wells | Mar. 7, 1944 |